United States Patent [19]

Hunt

[11] 4,313,304
[45] Feb. 2, 1982

[54] RADIANT ENERGY COLLECTION AND CONVERSION APPARATUS AND METHOD

[75] Inventor: Arlon J. Hunt, Oakland, Calif.

[73] Assignee: The United States of America as represented by the United States Department of Energy, Washington, D.C.

[21] Appl. No.: 61,165

[22] Filed: Jul. 26, 1979

[51] Int. Cl.³ .................................................. F03G 7/02
[52] U.S. Cl. ...................................... 60/641.8; 60/649; 60/676; 126/435; 126/452; 126/900
[58] Field of Search ............... 126/45, 432, 900, 435, 126/452; 60/649, 673, 641, 650, 682, 39.33, 39.46 S

[56] References Cited

U.S. PATENT DOCUMENTS

| | | | |
|---|---|---|---|
| 2,690,051 | 9/1954 | Peskin | 60/649 |
| 3,250,269 | 5/1966 | Sherock | 126/435 |
| 3,738,103 | 6/1973 | Rudolph et al. | 60/649 |
| 3,908,632 | 9/1975 | Poulsen | 165/104 X |
| 3,924,604 | 12/1975 | Anderson | 60/641 X |
| 4,000,733 | 1/1977 | Pauly | 126/900 |
| 4,047,518 | 9/1977 | Anderson | 126/432 |
| 4,055,948 | 11/1977 | Kraus et al. | 60/655 |
| 4,095,118 | 6/1978 | Rathbun | 290/2 |
| 4,167,856 | 9/1979 | Seidel et al. | 60/39.33 |

*Primary Examiner*—A. Michael Chambers
*Attorney, Agent, or Firm*—Sheldon R. Meyer; L. E. Carnahan; Roger S. Gaither

[57] ABSTRACT

The apparatus for collecting radiant energy and converting same to alternate energy form includes a housing having an interior space and a radiation transparent window allowing, for example, solar radiation to be received in the interior space of the housing. Means are provided for passing a stream of fluid past said window and for injecting radiation absorbent particles in said fluid stream. The particles absorb the radiation and because of their very large surface area, quickly release the heat to the surrounding fluid stream. The fluid stream particle mixture is heated until the particles vaporize. The fluid stream is then allowed to expand in, for example, a gas turbine to produce mechanical energy. In an aspect of the present invention properly sized particles need not be vaporized prior to the entrance of the fluid stream into the turbine, as the particles will not damage the turbine blades. In yet another aspect of the invention, conventional fuel injectors are provided to inject fuel into the fluid stream to maintain the proper temperature and pressure of the fluid stream should the source of radiant energy be interrupted. In yet another aspect of the invention, an apparatus is provided which includes means for providing a hot fluid stream having hot particles disbursed therein which can radiate energy, means for providing a cooler fluid stream having cooler particles disbursed therein, which particles can absorb radiant energy and means for passing the hot fluid stream adjacent the cooler fluid stream to warm the cooler fluid and cooler particles by the radiation from the hot fluid and hot particles.

15 Claims, 5 Drawing Figures

RADIANT ENERGY COLLECTION AND CONVERSION APPARATUS AND METHOD

BACKGROUND OF THE INVENTION

The invention described herein arose under work at Lawrence Berkeley Laboratory in the course of, or under, contract W-7405-ENG-48 between the United States Department of Energy (formerly Energy Research and Development Administration) and the University of California.

The present invention relates to apparatus and method for collecting radiant energy and converting same into an alternate energy form and in particular to collecting solar radiant energy by having same absorbed by small particles disbursed in a fluid stream.

BACKGROUND ART

Prior art radiant energy collectors can include fluid carrying channel devices which are coated with, for example, a black, radiant energy absorbent material. As the channel members conduct fluid therethrough, the radiant energy, as from the sun, absorbed by the black coating is re-radiated, conducted and convected to the moving fluid. In such an arrangement, the black absorbent covering is generally much hotter than the fluid being heated. As a consequence, the thermal efficiency of such a system is not as great as would be desirable. Further, the channel member is subject to thermal stress and subsequent breakdown due to the high temperatures developed and also due to cyclical heat-ups and cool-downs as, for example, happens during the non-operational and night shutdown periods for such a solar system. Further, there is always the possibility that hot spots can develop on the channel member resulting in the burning through of the channel member.

In actuality, a device for collecting solar radiation using the above principle generally requires a plurality of channel members, through which fluid must be pumped, in order to provide enough surface area which is coated with the black absorbent material to adequately and thoroughly heat the fluid. Thus, an additional disadvantage of this system is that there are significant pumping losses from pumping the fluid through the various bends and other inherent restrictions. Also, such devices are generally quite heavy, and there is always the possibility, as indicated above, that the hardware which connects the conduits will expand and contract at a rate different from the conduits themselves and thus eventually lead to leakage problems and a malfunction of the system.

In another prior device that is disclosed in U.S. Pat. No. 4,055,948, issued on Nov. 1, 1977 to Robert A. Kraus, a solar thermal radiation absorption and conversion system includes multiple arrays of sun-tracking mirror heliostats. The heliostats focus incoming thermal radiant energy through a highly light-transparent, radiation receiving, fluid containment shell located on top of a tall central tower. A radiant, heat absorbing fluid passes through the containment shell and is heated. The fluid includes minute particles of colloidal size suspended in a transparent heat, transfer fluid. The fluid is channeled between a first highly light-transparent and a second highly light reflecting wall of the shell. The minute particles, which are defined as being dull-black and non-reflecting, absorb the radiant energy flux and readily heat the fluid stream in which they are suspended. The thus heated fluid is sent through a heat exchanger where heat is transferred to a secondary fluid for driving a turbine. The cooled fluid, including the particles, is returned to the containment shell for reheating. In this system, the primary fluid which includes the particles much be isolated by the secondary fluid so that the particles do not come in contact with the fast turning turbine blades and cause damage thereto. Further, in such a system, there is always the problem of uneven heating or the development of hot spots which tend to shorten the life of the system by burning through the apparatus. Another problem associated with this device is that the particles agglomerate, reducing their light collection and thermal efficiency and also can collect on or about the first highly light-transparent wall, reducing the radiation which reaches the moving fluid with the colloidal suspension of particles.

SUMMARY OF THE INVENTION

The present invention is directed to overcoming one or more of the problems as set forth above.

In one aspect of this invention a method for converting a radiant energy flux to an alternate form of energy includes the steps of disbursing radiant energy absorbent particles in a fluid stream, passing the fluid stream and the disbursed particles past the radiant energy flux to heat the particles and the fluid, allowing the particles to vaporize in the radiant energy flux, and allowing the heated moving stream to expand to produce the alternate energy form.

In another aspect of the invention, an apparatus is provided for carrying out the above method.

The advantages over the prior art of this method and apparatus are as follows. First as the particles can absorb radiant energy, and as they have a large surface area in comparison to their volume, they tend to heat quickly and transfer their heat to the surrounding fluid stream. Accordingly, the temperature difference between the particles and the fluid stream is small, accounting for the high thermal efficiency of the system. Further, unlike the prior art, the internal and/or external surface of the housing or channel which conducts the fluid stream is not convered with a radiation absorbent material, in fact the internal surplus of the housing may be covered with a radiation reflectant material to reflect radiation into the stream of fluid and disbursed particles. Consequently, the highest temperature in the apparatus of the invention occurs in the gas itself and not in the housing which contains and channelizes the gas. In the prior art, the highest temperature occurs on the channel housing which accounted for thermal stress and fatigue in said housing. Stated alternatively, in the present invention the temperature of the housing for any given gas temperature is lower than the temperature of the housing of conventional systems.

Further, any hot spots are eliminated by the vaporization of the energy absorbent particles and the subsequent replacement of the vaporized particles by other particles moving in the fluid stream. Eventually all the particles are vaporized before they are allowed to expand in, for example, a gas turbine to produce an alternate form of energy, which in this case is mechanical energy. This being the case, there are no particles remaining in the fluid stream to damage the fast moving turbine blades. Thus, there is no need for a primary and secondary fluid stream and an inefficient heat exchanger coupling said streams to transfer heat to the secondary gas and allow said secondary gas to expand.

Also, as the particles vaporize, there is no need to condense said particles out before the gas goes to the turbine as might be required in a one loop system. Further, due to vaporization, there is no agglomeration of the particles. In the present invention, the vaporization of the particles does not create an emissions problem as the waste carbon dioxide is minimal.

Further, the apparatus of the invention is lightweight as there is no need for a plurality of conduits or channels as in prior devices and accordingly there is no significant pumping loss.

The disbursed particles provide for high optical efficiency with low scattering so that a minimal amount of radiation is reflected back out of the housing.

In another aspect of the invention, conventional fuel injection means and combustion means are provided in the housing to maintain the gas temperature should there be an interruption in the radiation received. Such a conventional system can be conveniently incorporated in the system at minimal additional cost due to the simplicity of the system design. Further, this eliminates any need for highly expensive and low-efficiency heat storage systems to compensate for such loss of radiation flux.

In another aspect of the invention, the particles are submicron in diameter and thus do not have to be vaporized as they can pass through the gas turbine without damaging the high speed turbine blades.

In another aspect of the invention, a radiation receiver comprises a housing having an interior space, a radiation transparent window for allowing radiation to be received in the interior space of the housing, and a radiation transparent/heat shield. The heat shield is spaced from the radiation transparent window and divides the interior space into a first compartment defined between the window and the heat shield and a second compartment. Means are provided for passing a stream of fluid through the first and second compartments. Means are provided for injecting radiation absorbent particles into the stream of fluid passing through said second compartment and means are provided for preventing radiation absorbent particles from passing through the first compartment. Thus, there can be no agglomeration, as in the prior art, of particles on the radiation transparent window to effect the thermal efficiency of the system. Further, any particles agglomerated thereon would soon be vaporized.

In yet another aspect of the invention, the heat shield can be removed when lower operating temperatures do not require same.

In another aspect of the invention, a method of transferring energy includes the steps of providing a hot fluid stream having hot particles disbursed therein, which particles can radiate energy and the step of providing a cooler fluid stream having cooler particles disbursed therein, which particles can absorb radiant energy. The method further includes passing the hot fluid stream adjacent the cooler fluid stream to warm the cooler fluid and cooler particles by radiation from the hot particles. Such a heat transfer system has all the advantages of the previous embodiments of the invention.

DETAILED DESCRIPTION OF THE PREFERRED EMBODIMENT

Figure 1:
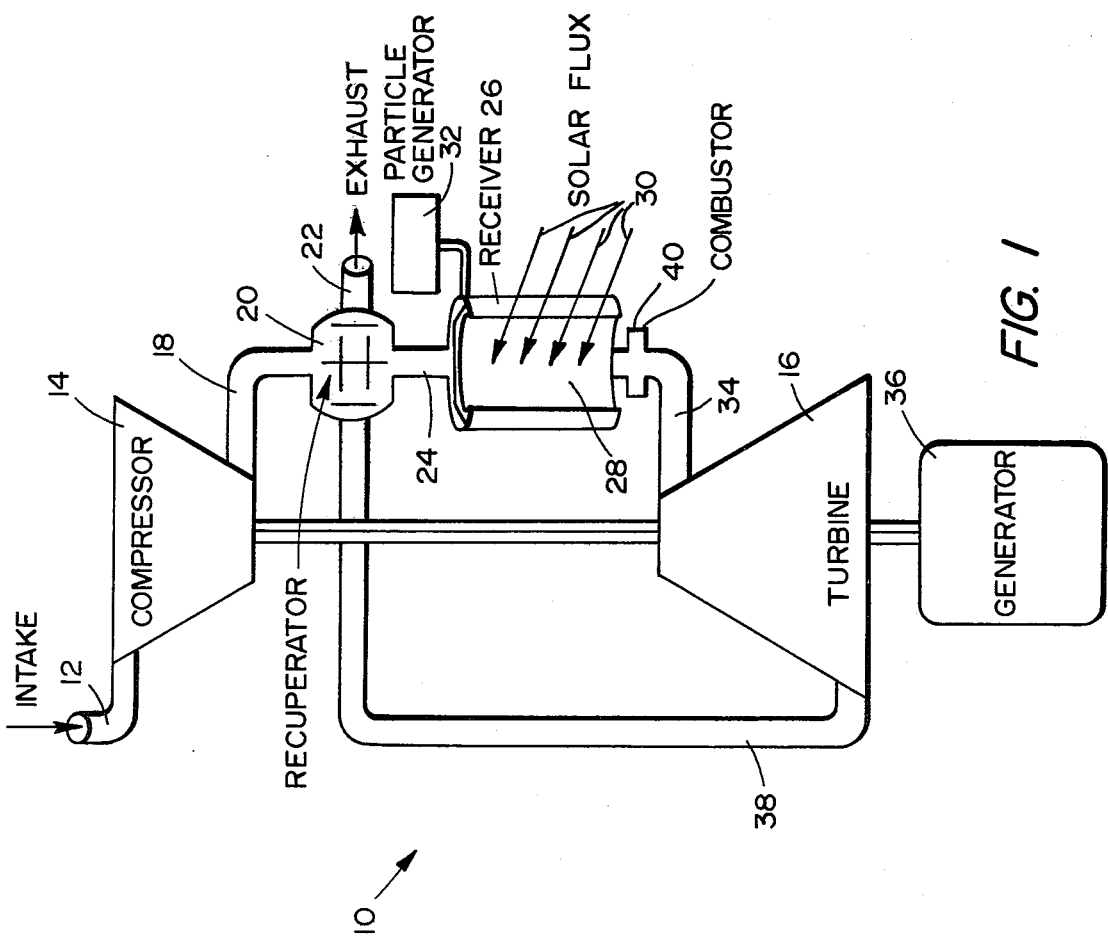
FIG. 1 is a schematic view of the system of the invention which includes a radiation receiver of the invention.

With reference to the figures, and in particular to FIG. 1, the radiant energy collection and conversion apparatus is depicted and generally denoted by the numeral 10. The schematic drawing in FIG. 1 represents an open Brayton cycle. However, it is to be understood that a closed Brayton cycle or other thermodynamic cycle could be used. In the open Brayton cycle gas, such as air, enters inlet 12 and is compressed by compressor 14. A conduit 18 directs the compressed gas to a recuperator or preheater 20 where the compressed gas is preheated by the exhaust of apparatus 10 which exits through exhaust or outlet 22. The preheated gas is delivered through conduit 24 to a caldron or radiation receiver 26. As will be discussed in greater detail hereinbelow, caldron 26 includes a radiation transparent window 28 which admits solar flux indicated by arrows 30 into receiver 26. Communicating with the upstream end of receiver 26 is a particle generator 32. Particle generator 32 produces a very small mass of fine, radiation absorbent particles, which in a preferred embodiment have a diameter in the submicron range, and injects said particles into the compressed gas stream prior to the gas stream flowing past the window 28. Details of the particle generator 32 and the particles themselves will be discussed hereinbelow. In the receiver 26 the particles absorb the solar radiation flux and heat the gas. Since the particles are such efficient heat exchangers, their temperature does not rise substantially above the temperature of the compressed gas. The gas-particle mixture continues to heat until the particles vaporize. The heated gas then passes through conduit 34 and into expansion turbine 16 which provides the power for operating compressor 14 and generator 36. The exhaust gas from turbine 16 is then directed by conduit 38 to recuperator 20 where the exhaust gas preheats the incoming compressed gas.

Also in a preferred embodiment a fuel injector and combustor means 40 is provided in communication with conduit 34 between receiver 26 and turbine 16. Alternatively, fuel injector and combustor means 40 can be provided in communication with conduit 24 between preheater 20 and receiver 26. The fuel injection and combustor means 40 provides conventional means for heating the incoming compressed gas should the solar flux fail for any reason. It is to be understood that such a combustor means is economically installed and used and eliminates the necessity of expensive energy storage means which would otherwise be necessary to guarantee continued performance of the system during the periods of little or no solar flux.

In a system design, the compressor, particle generator, turbine, and receiver are located in a central upstanding tower (not shown), such as that shown in U.S. Pat. No. 4,095,118, issued on June 13, 1978, to Kenneth R, Rathbun. It is to be understood that in such configuration the conventional fuel injection and combustor means can be located in the central tower or at the base thereof, wherever such location is convenient. The central tower is surrounded by an array of pivotally mounted reflectors disposed circumferentially thereabout, which reflect earth incident solar radiation to the receiver.

In the above open Brayton cycle, the exhaust includes a minimal amount of carbon dioxide due to the vaporization of the small mass of absorbent particles. Certainly these levels of pollution would not violate any existing or future projected air quality control standards. The open Brayton cycle does not require large cooling towers and the attendant use of water, which is usually associated with electric power plants. This being the case, it is possible to locate such systems in an arid desert area where water is at a preimum, but where consistent solar flux is guaranteed. If a closed Brayton cycle were to be used, a working fluid, such as water, would have to be recirculated through the system. This working fluid would be used to cool the gas before it is recompressed, and would require the construction of large cooling tower facilities to in turn cool the working fluid.

PARTICLE AND PARTICLE GENERATOR

The most appropriate methods for producing particles for this apparatus include high intensity arcs, thermal decomposition of hydrocarbons or carbon monoxide, and high temperature pyrolysis of organic resins. The high intensity arc has been established as a method for industrial production of submicron particles. Carbon, metals, semi-conductors and many other oxides have been produced at rates of kilograms to tens of kilograms per hour using a single arc. Carbon blacks have been produced chemically by thermal decomposition by a quenching procedure known as the channel process since 1872. The properties of these blacks vary widely, but they tend to be symmetrical in shape and to have particle diameters ranging from 0.01 to 0.5 micrometers. High temperature pyrolysis is used to produce vitrous carbon that has extremely high decomposition temperatures in air. Further discussion of these three methods can be found in the following sources. The high intensity arcs are discussed by J. D. Holmgren, et al at p. 129 of "Ultrafine Particles" (1963) W. E. Kuhn Ed., John Wiley & Sons, Inc., New York. The thermal decomposition of hydrocarbons is discussed by P. L. Walker, Jr., p. 297 "Ultrafine Particles" (1963) W. E. Kuhn Ed., John Wiley & Sons, Inc., New York. And the high temperature pyrolysis is discussed by J. S. Nadeau in the 57th volume of the *Journal of the American Ceramic Society* on pp. 303 to 306.

It is to be understood that the disbursement of pre-manufactured powders is extremely difficult due to the tendency of these small particles to agglomerate. Such disbursement must overcome the large surface forces that hold the particles together. Thus, it has been found that the best way to produce particles is to generate them at the site, by one of the above indicated methods, and entrain them in a gas stream, and conduct them to the receiver, thus minimizing the changes of agglomeration.

The operating temperature of the receiver 26 is determined by the oxidation rate of the particles. Carbon is an ideal material because the gas reaction rates for various allotropes of carbon can vary over many orders of magnitude and thus the appropriate temperature can be selected by the use of an appropriate carbon. The use of carbon has the additional feature that the combustion product is carbon dioxide. It should be emphasized at this point that the mass of particles used is extremely small compared to the amount of fuel burned by a conventional fossil fuel power plant. Thus, the amount of carbon dioxide generated is less than one-one-hundredth of the production of a fossil fuel plant of the same power.

Figure 3:
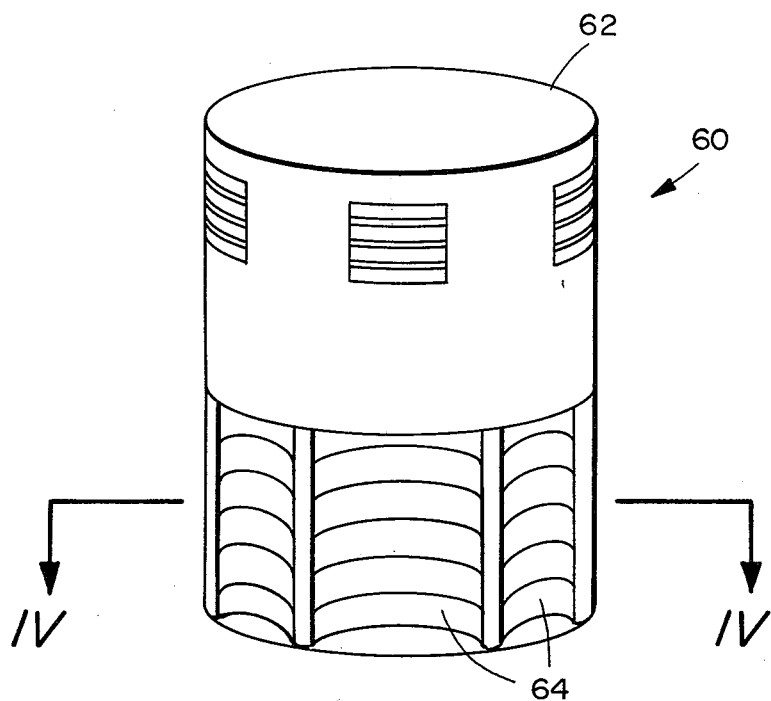
FIG. 3 is a second embodiment of the radiation receiver of the invention.
Figure 4:
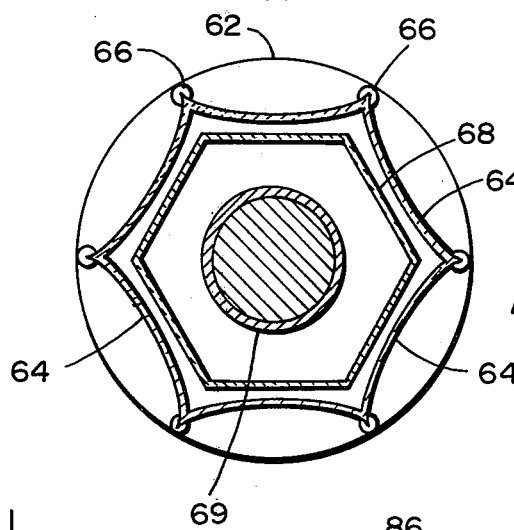
FIG. 4 is a cross-sectional view taken longitudinally through line 4—4 of FIG. 3.

Particles distributed throughout a volume of gas is a very efficient absorber of sunlight if the particle size and optical constants are chosen properly. If the characteristic absorption length of the light passing through the gases comprising the particles is greater than the particle diameter, then the entire volume of the particle is active as the absorber. For this and other reasons, submicron particles are used. The result is a high absorption coefficient for the incoming sunlight, or equivalently a high optical efficiency for the receiver. Since the infrared re-radiation from the heated gas will be inhibited from leaving the chamber by the window, further details of said window to be discussed hereinbelow, the receiver will have a high overall efficiency. One consequence of this is that the receiver is not restricted to a cavity type, but may be illuminated from all sides, as shown in the embodiments of FIGS. 3 and 4. This is an illustration of the characteristics of a diffuse suspension of small particles acting like a black body absorber.

The combination of the large surface area and the smal size of particles insures that the particle temperature stays to within a fraction of the degree of the gas temperature. Thus, the highest temperature present in the receiver is essentially that of the gas. This results in much lower radiant temperatures in the chamber than for other solar receivers which produce gases of the same temperature. This is particularly true of solar receivers which have a surface thereof coated with a black, absorbent material and thus rely on re-radiation conduction and connection to heat the moving fluid.

It is to be understood that light passing through a medium containing small particles may be scattered or absorbed. If the particles are sufficiently small and are composed of material that is intrinsically absorbing, the extinction (the name given to the combined effect of scattering and absorption) of a beam of light passing through a medium will be dominated by absorption.

Some reflective losses can be expected due to reflection from the surface of window 28. If quartz were used as the material for the window, with an index of refraction of 1.5, there would be a reflection of 4% per surface area for normal solar radiation incidence. This reflectivity would be substantially reduced by the use of anti-reflection coatings or by controlling the surface morphology.

Further, it is to be understood that in the submicron range, the absorption rate is constant for the various small particle sizes. This is due to the fact that the entire mass of the particle is used as an absorber, not merely the outer surface thereof.

FIRST PREFERRED EMBODIMENT OF SOLAR RECEIVER

Figure 2:
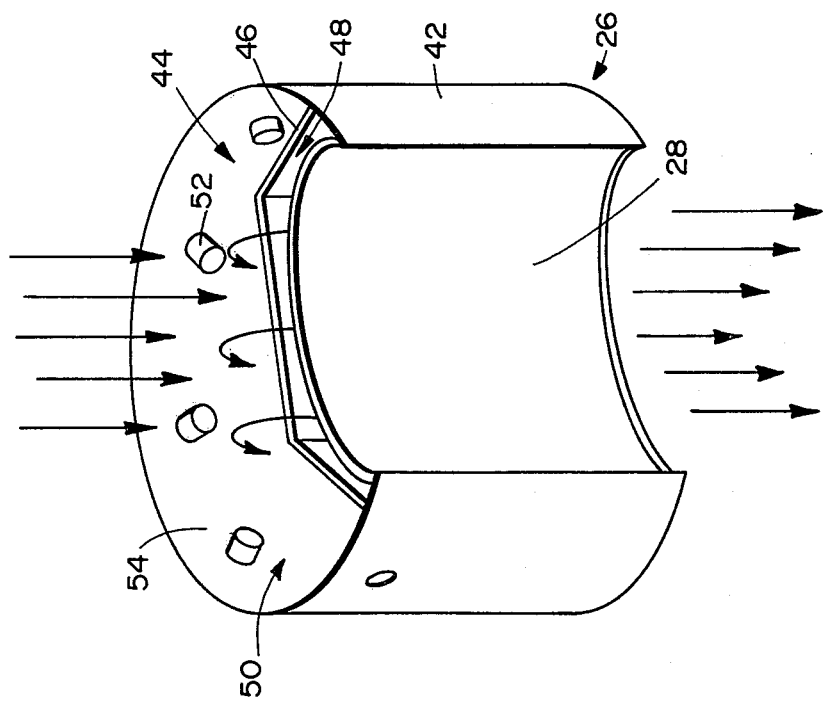
FIG. 2 is a perspective view of an embodiment of the radiation receiver of the invention.

FIG. 2 shows a more detailed perspective view of the structure of the radiation receiver 26. Receiver 26 includes the aforementioned concave window 28 which provides an opening in cylindrical housing 42. Housing 42 defines an internal cavity 44 which contains a heat shield 46. Heat shield 46 is located adjacent the window 28. Heat shield 46 divides the internal cavity 44 into a first chamber 48 which is defined between heat shield 46 and window 28 and a second chamber 50 which is defined between heat shield 46 and the remainder of housing 42. Mounted around the upper edge of housing 42 are a plurality of particle injectors 52 which communicate with the particle generator 32.

The function of the window 28 of the receiver 26 is to allow the solar flux to enter the internal cavity 44, to confine the pressurized gas-particle mixture and to prevent substantial loss of heat by infrared radiation. There are several materials that meet the solar transparency requirements for such a system. These include in a preferred embodiment Pyrex ® and quartz. These materials pass nearly the entire solar spectrum and are also opaque to radiation with wavelengths greater than four micrometers. This opacity in the infrared will reduce heat loss by radiation to a very low level.

The pressure requirements on the window are modest, on the order of four to six atmospheres for an open cycle Brayton system. As Pyrex ® has superior strength qualities and is cheaper than quartz, but does not have the high temperature capability of quartz, the window can be comprised of Pyrex ® to withstand the necessary pressures, while the heat shield can be comprised of quartz to withstand the necessary temperatures. As can be seen in FIG. 2, the window 28 is concaved inwardly to insure that the window remains in compression, providing the maximum strength for the Pyrex ®. Gas is circulated between the window 28 and heat shield 46 to cool the window. The main flow of gas with the entrained particles flows through the second chamber 50. A secondary gaseous flow which does not contain particles can be directed countercurrent to the particle flow through the first chamber 48 to cool the window 28 and to insure that particles do not collect on said window 28. The counterflow through the first chamber then mixes with the particle laden flow at the upper portion of the receiver 26. It is to be understood that alternatively, the particle injectors 52 can be located more downstream in the receiver 26 than is indicated in FIG. 2. If this is the case, the flow through the first chamber 48 can be in the same direction as the flow in chamber 50, as there will be little chance that particles will flow in first chamber 48. Further, it is to be understood that particle buildup on the window is not likely to be a serious problem, as the particles are so small that they move with the gas stream. If the particles do reach the window and adhere or do flow through chamber 48, they will quickly be heated to vaporization or combustion temperatures since they are in the region of maximum solar radiation flux.

A reflective surface 54 reflects solar radiation back into the flow of fluid.

Further, it is to be noted that the above receiver 28 does not require a high temperature pressure seal for the heat shield 46, as the pressure seal is provided by the window 28.

Also, it is to be noted that with the appropriate selection of operation parameters, the heat shield 46 of the receiver 26 can be eliminated, the window 28 then providing the necessary pressure sealing and temperature shielding.

SECOND RADIATION RECEIVER EMBODIMENT

FIGS. 3 and 4 depict a second radiation receiver embodiment which may be used in place of receiver 26 and which is designated by the number 60. Receiver 60 includes a cylindrical housing 62 and a plurality of concave windows 64 which allow housing 62 to be open on all sides. Concave windows 64 are provided with temperature and pressure seals 66 at their line of intersection. In a preferred embodiment, the window can be comprised of Pyrex ®. In this embodiment, a heat shield 68 is provided in the shape of a hexagon, the six flat surfaces thereof being associated with the concave surfaces of the window. A pillar is provided in the housing for support purposes and for providing a reflective surface 69 to reflect any solar radiation which strikes said surface back into the flow of fluid. Essentially all of the variations which are associated with the first embodiment of the receiver 28 discussed in conjunction with FIG. 2 can be applied to the receiver 60 of FIGS. 3 and 4.

The operation of the apparatus 10 is as described hereinabove. Further, it should be understood that with appropriately sized submicron particles, said particles need not be vaporized as they will pass through the turbine blades without causing damage thereto. Certainly, if the particles have diameters which are on the order of several microns, such particles would damage the turbine blade. Fortunately, with particles in each submicron size range, the particles are simply so small that they follow the motion of the gas and avoid hitting the turbine blades.

Thus, it can be realized that there are many advantages in using the above invention over the existing prior art. Since the receiver basically consists of a hollow chamber with a window, there is no need for heavy and complex heat exchanger elements, as is necessary with the prior art. Further, there is no pumping loss due to the forcing of gases through pipes and small orifices. This has the effect of considerably reducing the amount of energy required to overcome pressure losses. Further, in the above system, the particles can be vaporized so that there are no problems associated with maintenance, failures, heat stress or corrosion encountered with conventional solar heating systems. Also, there is no problem with thermo-decomposition of the working fluid or the reflective coatings. Further, there is no high stagnation temperature which can severely damage the collector system as the particles and fluid itself maintains a temperature which is greater than the surrounding receiver.

SMALL PARTICLE GAS-TO-GAS HEAT EXCHANGER

A non-solar use of the above invention can be in a gas-to-gas heat exchanger. The present gas-to-gas heat exchangers have limited use because they generally have significant temperature drops. Thus, these heat exchangers can usually be advantageously used only where large temperature changes are tolerable or desired. Small temperature drops in such systems can only be obtained through the use of very large surfaces. However, it is noted that small particles suspended in a gas stream have a large surface area for the small volume of material used.

Figure 5:
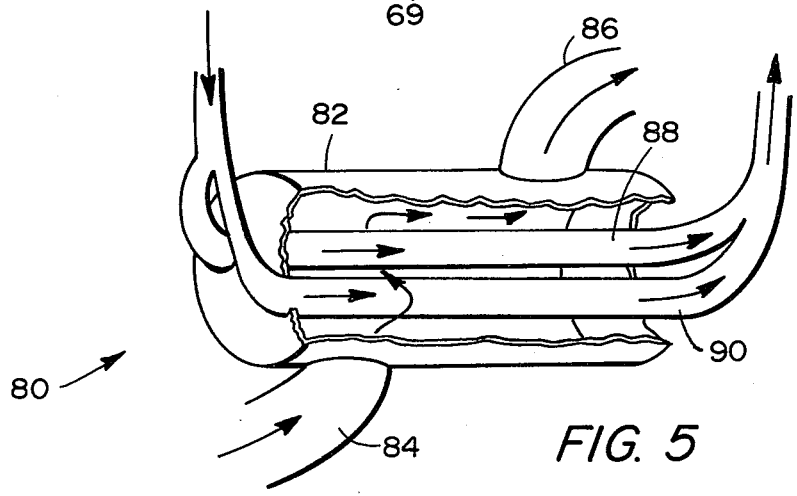
FIG. 5 depicts an embodiment of a heat exchanger of the invention.

FIG. 5 illustrates a small particle gas-to-gas heat exchanger 80. Heat exchanger 80 includes a drum housing 82 which has an inlet 84 for receiving a mixture of hot gases and particles and an outlet 86 for exhausting the hot mixture of gas and particles. Transparent tubes 88 and 90 are positioned in housing 82 to provide channels for the flow of a cooler mixture of gases and particles. The hot mixture of gases and particles flows over transparent tubes 88 and 90 but does not mix with the cooler air particle mixture which is conducted through said tubes 88 and 90. The tubes 88 and 90 are transparent to radiation of a wave length corresponding to the black body peak at the desired operating temperature.

The effectiveness of this gas-to-gas heat exchanger depends on the desired operating temperature. Since the heat exchanger depends on radiative transfer, the temperature must be high enough for a substantial amount of heat energy to be in that form. At temperatures of 1500° K., roughly one-tenth of the energy acquired by carbon particles at six atmospheres pressure is given up in the form of radiation. Since the gases by themsleves are generally not good radiators at these temperatures, the particles would dominate the radiative transfer process. At higher temperatures and lower pressures, the particles would be even more effective at radiating and heating the gas-particle mixture. A use of the above invention would be with modern fluidized bed combustor units utilizing Brayton cycles. These units presently must use expensive, high temperature filtration to remove the particles from the gas stream before passing it through the turbine. The combustion process must be carried out at a high pressure which for a large fluidized bed means that the vessels become very heavy. An efficient gas-to-gas heat exchanger would allow lower pressures that would simplify the design and eliminate the need for the high temperature filtration.

Other aspects, objects, and advantages of this invention can be obtained from a study of the drawings, the disclosure, and the appended claims.

I claim:
1. A method for producing power from solar radiation flux, including the steps of:
 disbursing radiant energy absorbent vaporizable particles in a fluid stream;
 passing the fluid stream and disbursed vaporizabele particles past the solar radiation flux to heat the particles and the fluid;
 allowing the particles to vaporize by absorbing solar radiation flux; and
 allowing the heated stream to expand through means to produce power.

2. The method of claim 1 including the step of:
 pressurizing the fluid stream before the disbursing step.

3. The method of claim 1, wherein said power means includes a turbine.

4. The method of claim 1 including the step of:
 exhausting the expanded, heated fluid stream to the atmosphere.

5. A method of producing power from solar radiation flux including the steps of:
 disbursing radiant energy absorbent vaporizable particles of submicron diameters in a fluid stream;
 passing the fluid stream and disbursed vaporizable particles past the solar radiation flux to heat the particles and the fluid causing the particles to vaporize; and
 allowing the heated stream to expand through means to produce power.

6. A method of transferring energy including the steps of:
 providing a hot fluid stream having hot solar radiation vaporizable particles of submicron diameters disbursed therein; vaporizing said particles by solar radiation;
 providing a cooler fluid stream having cooler solar radiation vaporizable particles of submicron diameters disbursed therein, which particles can be vaporized by said solar radiation;
 passing the hot fluid stream adjacent the cooler fluid stream to warm the cooler fluid and cooler particles by heat transfer from the hot fluid stream in a heat exchange relationship.

7. The method of claim 6 including the step of:
 producing the vaporizable particles having diameters in the range of 0.01 to 0.5 micrometers.

8. The method of claim 6 including the step of:
 allowing the cooler vaporizable particles to be vaporized by the radiation from the hot fluid stream and hot vaporizable particles.

9. The method of claim 6 including the step of:
 allowing the cooler fluid stream to expand through means to produce power.

10. A solar radiation absorption and conversion system comprising:
 a solar radiation collection vessel having a solar radiation transparent window and an interior space;
 means for passing a stream of fluid past said window;
 means for injecting radiation absorbent vaporizable particles of submicron diameters in said steam of fluid prior to the fluid stream passing said window;
 solar radiation means for vaporizing said radiation absorbent particles; and
 means for allowing the stream of fluid and vaporized particles to expand through means to produce power after it has passed said window.

11. The apparatus of claim 10 wherein said power means includes a turbine.

12. The apparatus of claim 10 wherein the injecting means includes means for injecting vaporizable radiation absorbent particles having a submicon diameter.

13. The apparatus of claim 10 including means for injecting combustible fuel in said stream of fluid.

14. The apparatus of claim 12 including means for combusting said fuel.

15. The apparatus of claim 10 including means for generating the vaporizable radiation absorbent particles having diameters ranging from 0.01 to 0.5 micrometers.

* * * * *